Jan. 16, 1962   J. J. KOLFENBACH ET AL   3,016,701
METHOD FOR LUBRICATING A JET ENGINE
Filed Jan. 18, 1961

John J. Kolfenbach
Walter W. Gleason   Inventors

By R. P. Crowley   Patent Attorney

3,016,701
METHOD FOR LUBRICATING A JET ENGINE
John J. Kelfenbach, North Plainfield, and Walter W. Gleason, Cranford, N.J., assignors to Esso Research and Engineering Company, a corporation of Delaware
Filed Jan. 18, 1961, Ser. No. 83,464
14 Claims. (Cl. 60—39.08)

This invention concerns an improved method for lubricating and cooling jet engines and associated parts. More particularly, this invention relates to a process for cooling those parts of a jet aircraft engine through and about which lubrication compositions are circulated. This application is a continuation-in-part of serial No. 499,583, filed April 6, 1955, now Patent No. 2,974,475.

In the operation of turbine engines, such as turbo-jet, turbo-fan jet, bypass jet, and particularly turbo-jet aircraft enginers, it is customary to circulate through or to have contacted by lubricating compositions various engine parts, e.g. the turbine bearings, compressor bearings and the like, to provide efficient and effective lubrication. In turbo-jet aircraft, in particular, a lubricating composition is circulated at a high rate of flow through the bearings supporting the turbine itself. The lubricant composition circulated lubricates these parts and provides some cooling effect through the picking up of the heat of friction and the like by the lubricant composition. In the past, excess heat of the lubricant composition has been dissipated by circulating fuel through the lubricating composition reservoir and using the fuel as a heat sink. In order to maintain the parts and especially the bearings at a reasonable operating temperature, very high rates of lubricating composition flow are necessary. The lubricant flow rate necessary approximates that of the fuel flow rate, and consequently considerable power must be expended to circulate the lubricating composition. The actual lubrication of the bearings themselves and the other lubricated parts can be accomplished by using a very small amount of lubricant. Thus, if sufficient cooling and lubrication is provided, the flow rate of the lubricating composition can be greatly reduced without impairing lubrication and with a resultant substantial power saving.

It has been discovered that efficient cooling for the bearings and other lubricated parts of aircraft turbine engines is effected by providing a hydrocarbon composition comprising a suitable lubricating constituent and a hydrocarbon constituent capable of endothermically decomposing when placed in a heat exchange relationship with the part to be cooled. The lubricating of the part, and particularly the bearings through which the above composition is circulated, is accomplished by the lubricant in the usual manner, but now only the amount of lubricant actually required for lubrication is needed. The hydrocarbon capable of decomposition is then endothermically depolymerized or converted by the heat absorbed in contacting the lubricated part and is thereby converted, preferably to useful fuel constituent. By this process, the mount of lubricant required for lubrication is substantially decreased, and the greatly increased cooling effect of depolymerization allows the flow rate to be substantially decreased with a large saving in power consumption and lubricant.

It is an object of the present invention to provide a method for lubricating an internal combustion jet engine in which a cooling effect is obtained by the endothermic decomposition of a hydrocarbon composition.

It is another object to provide a method for lubricating the associated parts of a turbo-jet engine or the like by contacting the lubricated surface with a lubricant composition containing a hydrocarbon constituent capable of decomposing into a conjugated diolefin by the absorption of heat.

It is a further object to provide a method for lubricating the bearings of a turbo-jet engine by circulating a lubricant containing a hydrocarbon constituent which absorbs heat from the bearings while endothermically decomposing into a useful fuel constituent which is then burned together with excess lubricant.

Hydrocarbons which may be utilized in the hydrocarbon composition of the instant method include those hydrocarbon compounds capable of endothermically decomposing, particularly those compounds decomposing to a useful fuel composition. A desirable class of materials for this purpose are those compounds which endothermically are converted into useful fuel constituents by a reverse Diels-Alder reaction i.e. in which an alicyclic compound is decomposed at elevated temperatures to dieneophile and a diene, wherein the dienophiles contain a double or triple bond conjugate with a carbonyl or nitrile group such as acrolein, croton aldehyde, acrylic acid, crotononitrile, acetylenic dicarboxylic esters, quinones, vinyl ethers, furan, and the like. A suitable reverse endothermic conversion would be the depolymerization to yield an aliphatic conjugated diene and an olefinic carbonyl compound. A particularly desirable class of materials are those compounds which depolymerize to form an aliphatic conjugated diolefin, which may be utilized as a fuel component in the engine. Although those cyclic hydrocarbons forming a useful fuel component are preferred, any cyclic hydrocarbon which endothermically decomposes to a conjugated diolefin may be utilized in the circulating reservoir system. Suitable 6-membered cyclic compunds thus include 3,4-dimethyl tetrahydrobenzaldehyde, which decomposes to 2,3-dimethyl butadiene and acrolein, vinyl-ether-acrolein adducts (2-methoxy 2,3-dihydro-Y-pyran), and so forth. The preferred hydrocarbon constituent to be employed is dicyclopentadiene, and its lower alkyl substituents, which will decompose in an endothermic reverse Diels-Alder reaction at temperatures of about 130° to 150° C. into the monomer cyclopentadiene, a conjugated diolefin. The depolymerization of dicyclopentadiene absorbs a substantial quantity of heat, while the depolymerized cyclopentadiene formed is a highly effective and useful fuel component. Conjugated diolefins constitute a preferred class of fuels for reaction motors. Other substances decomposing into conjugated diolefins and applicable to the present invention include methyl dicyclopentadiene, dimethyl dicyclopentadiene, and homologues thereof, as well as butadiene dimer, butadieneisoprene codimer, the depolymerization of cyclohexene to ethylene and butadiene, and the like. It is within the purview of the present invention that the dicyclopentadiene, when employed as the principal fuel constituent, may be mixed with other substances such as those formed as by-products during its manufacture. Dicyclopentadiene is itself a by-product of the high temperature steam cracking of gas oil. A typical material useful in the present invention has the following composition:

| Compound: | Volume Percent |
|---|---|
| Dicyclopentadiene | 69.9 |
| Methyl dicyclopentadiene | 20.4 |
| Acyclic dienes—(isoprene, etc.) | 3.4 |
| Codimer—Mol. wt. 134 (dicyclopentadiene codimer with isoprene, etc. side chain) | 4.4 |
| Codimer—Mol. wt. 148 methyl dicyclopentadiene with isoprene, etc. side chain) | 1.3 |
| Dimethyl dicyclopentadiene | 0.6 |

The lubricating compositions employed in conjunction with the above hydrocarbon constituent are those natural and synthetic lubricating compositions suitable for use in internal combustion engines, and particularly those lubricating compositions suitable for use in lubricating the bearings of turbine engines. Suitable lubricants to be utilized in the inventive method would include those lubricants meeting the requirements of MIL–L–7808C(1), MIL–C–8–88B(1), MIL–L–25330, MIL–O–6081B(4), MIL–L–6082(B), MIL–L–25336A, MIL–L–9236A, MIL–O–6081B(3), and MIL–L–25968.

Suitable synthetic and natural lubricating compositions are those compositions having a specific heat in B.t.u./lb./°F. of from 0.4 at 100° F. to 0.65 at 300° F. Preferred synthetic lubricants are those described in U.S. Patents 2,921,029, 2,938,871, 2,723,206, 2,743,234, 2,575,196, 2,705,724, and 2,723,286, which comprise mixtures of diesters and complex esters containing added load carrying agents, oxidation inhibitors, and antifoamants. Suitable natural lubricants are those defined by Military Specifications MIL–O–6081 and MIL–O–6082, and which comprise mixtures of refined natural petroleum fractions.

Straight mineral lubricating oils or distillates derived from paraffinic, naphthenic, asphaltic, or mixed base crudes or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc. Hydrogenated oils, white oils, or shale oil may be employed as well as synthetic oils, such as those prepared, for example, by the polymerization of olefins or by the reaction of oxides of carbon with hydrogen or by the hydrogenation of coal or its products. Also for special applications, animal, vegetable or fish oils or their hydrogenated or volatilized products may be employed in admixture with mineral oils.

Also, synthetic lubricating oil may be employed in the invention. The synthetic oils include synthetic lubricating oils having a viscosity of at least 30 SSU at 100° F., such as esters of monobasic acids (e.g. ester of $C_8$ oxo alcohol with $C_8$ oxo acid, ester of $C_{13}$ oxo alcohol with octanoic acid, etc.), esters of dibasic acids (e.g. di–2–ethyl hexyl sebacate, di-nonyl adipate, etc.), esters of glycols, (e.g. $C_{13}$ oxo acid diester of tetraethylene glycol, etc.), complex esters (e.g. the complex ester formed by reacting one mole of sebacic acid with two moles of tetraethylene glycol and two moles of 2-ethyl-hexanoic acid, complex ester formed by reacting one mole of tetraethylene glycol with two moles of sebacic acid and two moles of 2-ethyl hexanol, complex ester formed by reacting together one mole of azelaic acid, one mole of tetraethylene glycol, one mole of $C_8$ oxo alcohol, and one mole of $C_8$ oxo acid), esters of phosphoric acid (e.g. the ester formed by contacting three moles of the mono methyl ether of ethylene glycol with one mole of phosphorus oxychloride, etc.), halocarbon oils (e.g. the polymer of chlorotrifluoroethylene containing twelve recurring units of chlorotrifluoroethylene), alkyl silicates (e.g. methyl polysiloxanes, ethyl polysiloxanes, methyl-phenyl polysiloxanes, ethyl-phenyl polysiloxanes, etc.), sulfite esters (e.g. ester formed by reacting one mole of sulfur oxychloride with two moles of the methyl ether of ethylene glycol, etc.), carbonates (e.g. the carbonate formed by reacting $C_8$ oxo alcohol with ethyl carbonate to form a half ester and reacting this half ester with tetraethylene glycol), cercaptals (e.g. the mercaptal formed by reacting 2-ethyl hexyl mercaptan with formaldehyde), formals (e.g. the formal formed by reacting $C_{13}$ oxo alcohol with formaldehyde), polyglycol-type synthetic oils (e.g. the compounds formed by condensing butyl alcohol with fourteen units of propylene oxide, etc.), or mixtures of any of the above in any proportions. Also, mixtures of synthetic and mineral lubricating oils in any proportions may be employed.

The exact combination of the lubricant and the hydrocarbon capable of endothermically decomposing at elevated temperatures depends in part upon the specific heat of the ingredients, the endothermic heat of depolymerization or conversion of the hydrocarbon capable of depolymerization or conversion, the decreased flow rate of the circulating composition desired, the desired temperature limits to be maintained of the lubricated part and other preselected factors. Suitable compositions would include those compositions where the hydrocarbon composition capable of decomposing in a useful fuel element comprises from 10 to 95% of the composition. Preferred compositions are those consisting of from 5 to 60% by weight of lubricant, while especially preferred are those compositions of from 5 to 40% by weight lubricant and 95 to 80% by weight of the hydrocarbon capable of depolymerization.

The inventive process comprises the contacting of the lubricating surfaces to be lubricated and cooled by the hydrocarbon composition described above, whereby the surface is lubricated in the usual manner by the lubricant while the hydrocarbon constituent endothermically decomposes by absorbing heat from the lubricated area or part. The composition comprising excess lubricant and a mixture of decomposed and/or undecomposed and decomposed hydrocarbon depending upon the particular amount of heat absorbed, is then returned to the lubricating reservoir from which it originated where the heat is dissipated in the usual manner when the lubricant itself was employed as the coolant. This method is referred to as the continuous lubricating system. Another method is to use a one-pass lubrication system where the composition decomposes in whole or part to a useful fuel constituent and instead of returning to the main reservoir is passed, e.g. from the turbine bearings, directly to the engine combustion chamber or the after-burner of the jet engine where the useful fuel constituent and the excess lubricant are burned in conjunction with the regular fuel. In this system, it is preferred to employ a natural lubricant that can more readily be burned in conjunction with the normal fuel of the engine, but synthetic lubricants may also be utilized. This method allows a continual supply of fresh lubricant to the lubricant surface, while the excess used lubricant and the hydrocarbon converted to the useful fuel component augments the regular fuel supply with the consequential use of less fuel. Thus, the essence of the present inventive method is not dependent upon the particular lubricant composition selected, but rather is concerned with a process for utilizing a particular component capable of endothermic conversion with a suitable lubricant in known circulating aircraft lubricating systems to provide unexpected advantages in cooling, lubrication, and power consumption.

Figure 1:
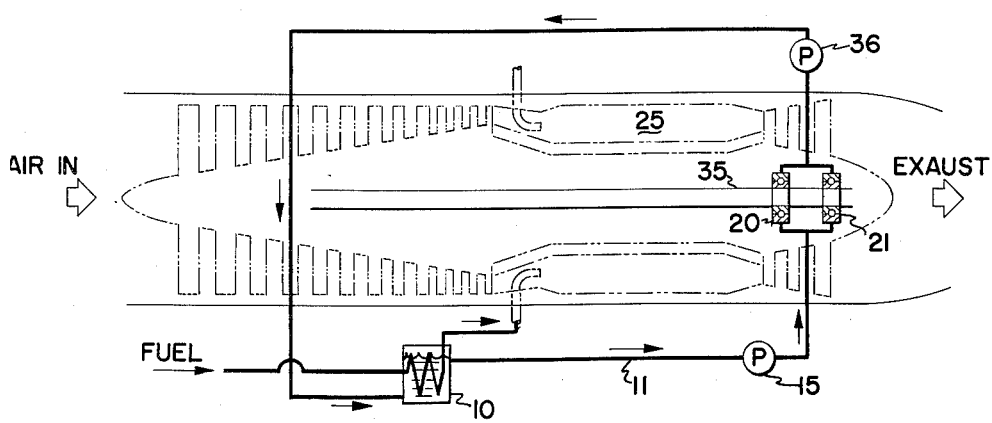
FIGURE 1 is a diagrammatical representation of the inventive continuous lubricating system in a jet engine.

Turning first to FIGURE 1, there is shown a schematic diagram of a turbo-jet engine wherein the main lubricating composition reservoir 10 at a typical in-flight temperature of about 275° F. supplies a lubricating composition as described through a supply line to an inlet oil supply pump 15, which, at pressures of about 40–60 p.s.i., pumps the cool lubricating composition to the front 20 and rear 21 turbine bearings, which are mounted on the jet engine turbine shaft 35. The flow rate of the lubricating composition is adjusted according to the amount of lubrication and the desired temperature level of the turbine bearings. Typical in-flight operating temperatures maintained in compressor bearings are 350°–450° F. with front turbine bearings 450–550 and the rear turbine bearings 500–650° F. The lubricating composition flowing through the bearings simultaneously lubricates the bearings, and maintains the bearings at a relatively cool temperature by the endothermic decomposition of the hydrocarbon constituent. The lubricating composition comprising the excess and used lubricant along with the decomposed hydrocarbon constituent is then pumped by outlet oil pump 36 at pressures of about 10-20 p.s.i. back to the main lubricating reservoir. Any heat removed from the turbine bearings, which decomposes the hydrocarbon constituent, for example, the liquid dicyclopentadiene, to the monomer vapor is then removed in a conventional manner. One method of accomplishing this task is to pass the fuel employed in the jet engine through the lubricating reservoir as shown, thereby removing the excess heat of vaporization and polymerization, for example, converting the cyclopentadiene monomer vapor back to the dicyclopentadiene liquid. The fuel which has been employed as a heat sink is then passed in the usual manner to the combustor 25 where it is burned. A similar process may be employed to lubricate the compressor bearings which are not shown. In the system described, the lubricating composition is continuously circulated and lubricates the bearings, while the endothermic conversion of the hydrocarbon cools the bearings to maintain the desired temperature control level.

Figure 2:
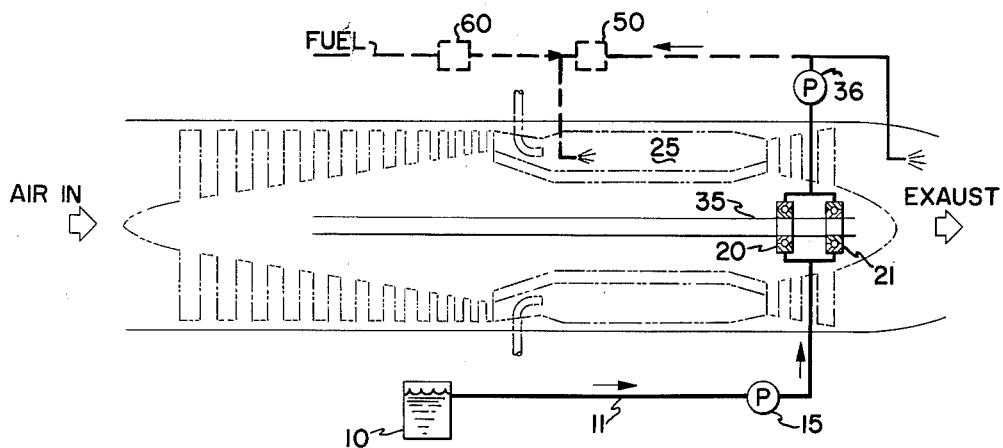
FIGURE 2 is a diagrammatical representation of the one-pass lubrication system of the present invention in a jet engine.

FIGURE 2 demonstrates the inventive one-pass system wherein the lubricating composition, after lubricating and cooling the turbine bearings, is utilized as a useful heat component to supplement the fuel supply. This is accomplished as shown in the drawing by directing the lubricating composition, for example, a composition of 90% dicyclopentadiene and 10% natural lubricants, which has now been decomposed to a useful fuel component and excess lubricant, to the combustion section or after-burner of the jet engine, where it is burned along with the jet engine fuel. The preferred method is to introduce the used lubricant composition and depolymerized monomer vapor into the low pressure after-burner section of the jet engine where it is burned in the jet exhaust. This preferred method of operation of the single-pass system is shown in FIGURE 2. In the preferred one-pass system, the outlet pump pressures may be lower than normal due to the introduction of the composition into the low pressure exhaust section. Alternatively, the used depolymerized lubricant composition may be introduced into the fuel injection system by employing a suitable booster pump 50 operating at about 20 to 80 p.s.i. ahead of the usual fuel gear pump 60 (200-300 p.s.i.) to condense the depolymerized monomer vapor. In this method, the used lubricant composition is then injected and burned with the regular jet engine fuel in the combustors. Further, the depolymerized lube-monomer mixture may be introduced directly into the combustor section and burned in conjunction with the regular fuel. In this method, means such as a higher pressure booster pump like pump 50 must be supplied whereby the composition to be injected can overcome the pressure in the combustor. The pressure in the combustor varies with the altitude. Both latter methods are shown in FIGURE 2 by dotted lines.

Thus, in review, both lubricating-cooling systems described may be utilized to cool engine surfaces and particularly jet engine compressor and turbine bearings. The circulatory system may utilize conventional cooling techniques, while in the one-pass system the used composition is burned as a fuel in the jet exhaust or in the combustor section. In the one-pass system, the hydrocarbon constituent employed must be one that decomposes to a useful fuel constituent.

The great advantages of the foregoing process may more readily be seen by the following examples:

EXAMPLE 1

The following data demonstrate the variation in specific heat of typical turbine jet engine lubricating compositions with temperature.

Table I
SPECIFIC HEATS OF LUBRICATING COMPOSITIONS

| Lubricant | @ 100° F. | @ 200° F. | @ 300° F. |
|---|---|---|---|
| Grade 1010 low viscosity mineral oil [1] | .442 | .517 | .593 |
| Grade 1065 high viscosity mineral oil [2] | .435 | .512 | .588 |
| Synthetic low viscosity A (new)[3] | .45 | .502 | .565 |
| Synthetic low viscosity A (used) | .494 | 5.75 | .648 |
| Synthetic high viscosity B [4] | .402 @ 77 | .490 @ 194 | .531 @ 248 |

[1] Meeting military specifications MIL-O-6081 and comprising a mixture of petroleum fractions.
[2] Meeting military specifications MIL-O-6082 and comprising a mixture of petroleum fractions.
[3] Meeting military specifications MIL-L-7808C and comprising a complex ester mixture of di-2-ethyl hexyl sebacate and minor amounts of an alkyl phosphate.
[4] A commercial turbine powered aircraft lubricant comprising a complex ester mixture of di-2-ethyl hexyl-sebacate and a polyalkylene glycol.

EXAMPLE 2

A synthetic lubricating oil consisting of a dibasic acid ester as described in U.S. Patent 2,703,811, suitable for lubricating bearings in jet engines, has the following heat absorption characteristics:

Specific heat B.t.u./lb./° F. _____ 0.65
Temperature difference between bulk oil inlet temperature and bearing outlet temperature ($\Delta$ T), ° F._ 75
B.t.u. absorbed per pound of oil circulated _____ 49

A blend consisting of 90% dicyclopentadiene and 10% by weight of the same synthetic lubricating composition would have the following heat absorption characteristics:

Specific heat _____ 0.65
Difference between bulk oil inlet temperature and bearing outlet temperature, ° F. _____ 225
Heat absorbed in raising temperature of one pound of oil to bearing temperature, B.t.u. _____ 146
Heat absorbed by depolymerizing 0.9 pound of dicyclopentadiene, B.t.u. _____ 362
Total heat absorbed per pound of lubricant, B.t.u. _ 508

The composition containing the dicyclopentadiene, then, is capable of absorbing 508 divided by 49, or 10.2 times as much heat per pound as the conevntional lubricant. From the heat absorbed viewpoint, the flow rate to the bearing could be reduced to 1/10 the normal rate. In addition to substantial savings in pumping, a much smaller amount of lubricating oil could be employed, namely, that required only for the lubricating of the bearings, etc.

EXAMPLE 3

Table II
HEAT ABSORBED BY LUBRICANT COMPOSITIONS ALONE

| Lubricant (as in Table I) | 1010 | 1065 | B | A |
|---|---|---|---|---|
| Specific heat (B.t.u./lb./° F.) average at about 250° F | 0.55 | 0.55 | 0.52 | 0.52 |
| Temperature difference between bearing inlet and outlet temperature ($\Delta$T) | 75 | 75 | 75 | 75 |
| B.t.u. absorbed/lb. of lubricant circulated | 41.3 | 41.3 | 39 | 39 |

The above Table II indicates the heat absorbed by the use of the lubricant itself as a coolant without the benefit of the instant inventive process. The following Table III demonsrates that with a temperature difference of 225° F. between the inlet and outlet lubricant temperature circulated through the turbine bearings as compared to 75° F. in the above table, the use of the inventive process allows substantial decrease in the flow rate of the lubricant circulated through the bearings in addition to the other advantages heretofore mentioned.

Table III
HEAT ABSORBED BY USE OF INVENTIVE PROCESS

| Lubricant used (see Table I) | 1010 | 1010 | 1065 | B |
|---|---|---|---|---|
| Weight percentage of lubricant | 10 | 75 | 50 | 50 |
| Weight percentage of dicyclopentadiene | 90 | 25 | 50 | 50 |
| Average specific heat of mixture | 0.65 | 0.56 | 0.58 | 0.58 |
| Temperature difference, °F., between inlet and outlet bearing temperature | 225 | 225 | 225 | 225 |
| Heat in B.t.u. absorbed in raising temperature of 1 lb. lubricant to bearing temperature | 146 | 126 | 131 | 131 |
| Heat in B.t.u. absorbed by depolymerizing the dicyclopentadiene | 362 | 101 | 201 | 201 |
| Total heat in B.t.u. absorbed per pound of composition | 508 | 227 | 332 | 332 |
| Heat advantage of process | 12.4 | 5.5 | 8.1 | 8.5 |

The above table demonstrates the striking increase in heat advantage that is obtained by using the inventive process to cool and lubricate the engine bearings.

What is claimed is:

1. The process of cooling and lubricating surfaces on an engine, which process comprises: contacting the surfaces to be lubricated with a lubricating composition containing a lubricant and a hydrocarbon capable of endothermic conversion by a reverse Diels-Alder reaction, absorbing of sufficient heat by said lubricating composition to effect the aforesaid conversion, and subsequently dissipating said heat absorbed by a heat exchange relationship between the lubricating composition and the hydrocarbon fuel.

2. A process as defined in claim 1 wherein said hydrocarbon capable of conversion is selected from the group consisting of dicyclopentadiene and the lower alkyl substituents of dicyclopentadiene.

3. A proces of lubricating and cooling surfaces in an engine, which process comprises: contacting said surfaces with a lubricating composition containing a lubricant and a cyclic hydrocarbon capable of depolymerization to a conjugated diolefin by the absorption of heat, depolymerizing said hydrocarbon by the absorption of sufficient heat to form a conjugated diolefin, lubricating said surface by the action of the lubricant, and subsequently burning said conjugated diolefin together with excess lubricant in said engine.

4. The process according to claim 3 wherein said hydrocarbon capable of conversion is selected from the group consisting of dicyclopentadiene and the lower alkyl substituents of dicyclopentadiene.

5. The process according to claim 3 wherein said lubricant is a mineral oil lubricant.

6. The process according to claim 3 wherein said lubricating composition contains from 5 to 90% of said lubricant and from 10 to 95% by weight of said hydrocarbon.

7. The process according to claim 3 wherein said hydrocarbon is butadiene dimer.

8. The process according to claim 3 wherein said hydrocarbon is butadiene-isoprene codimer.

9. The process of lubricating bearings in a turbine engine, which process comprises: contacting said bearings with a lubricant composition consisting of from 5 to 90% by weight of a mineral oil lubricant being burned in said engine and from 10 to 95% by weight of a hydrocarbon capable of depolymerization to a conjugated diolefin by the absorption of heat, depolymerizing said hydrocarbon by the absorption of heat from said bearings, lubricating said bearings by the action of said lubricant, and subsequently burning the resultant excess lubricant and depolymerized hydrocarbon in said engine.

10. A process according to claim 9 wherein said hydrocarbon is dicyclopentadiene.

11. A process according to claim 9 wherein said hydrocarbon is methyl dicyclopentadiene.

12. A process according to claim 9 wherein said hydrocarbon is dimethyl dicyclopentadiene.

13. The process according to claim 9 wherein said hydrocarbon is butadiene dimer.

14. The process according to claim 9 wherein said hydrocarbon is butadiene-isoprene codimer.

No references cited.